United States Patent [19]

Kraus

[11] 4,386,536

[45] Jun. 7, 1983

[54] INFINITELY VARIABLE TRACTION ROLLER TRANSMISSION

[75] Inventor: James H. Kraus, Huntington Beach, Calif.

[73] Assignee: Excelermatic Inc., Austin, Tex.

[21] Appl. No.: 217,852

[22] Filed: Dec. 18, 1980

[51] Int. Cl.³ ............................................. F16H 15/16
[52] U.S. Cl. .......................................... 74/200; 74/196
[58] Field of Search .................. 74/196, 198, 199, 200

[56] References Cited

U.S. PATENT DOCUMENTS

| | | | |
|---|---|---|---|
| 2,931,234 | 4/1960 | Hayward | 74/200 |
| 3,413,864 | 12/1968 | Magill et al. | 74/200 |
| 3,802,284 | 4/1974 | Sharpe et al. | 74/200 |
| 4,086,820 | 5/1978 | Kraus et al. | 74/200 |
| 4,275,610 | 6/1981 | Kraus | 74/198 |
| 4,314,485 | 2/1982 | Adams | 74/196 |

*Primary Examiner*—Kenneth Dorner
*Attorney, Agent, or Firm*—Klaus J. Bach

[57] ABSTRACT

A traction roller transmission with traction rollers arranged between and in engagement with toric discs for the transmission of motion therebetween includes traction roller support trunnions which are pivotally supported by saddles nested in curved sections of a force balancing band structure which extends around all the traction rollers. The saddles and trunnions have support surfaces with a curvature whose centerline is a tangent to the center circle to the toroidal cavity formed between the discs to permit pivoting of the trunnions for a change of the transmission ratio. The trunnions extend axially through openings in the balancing bands and have pistons at their ends disposed in cylinders to which pressurized fluid can be supplied to cause axial precess movement of the trunnions for initiation of a change of the transmission ratio.

4 Claims, 3 Drawing Figures

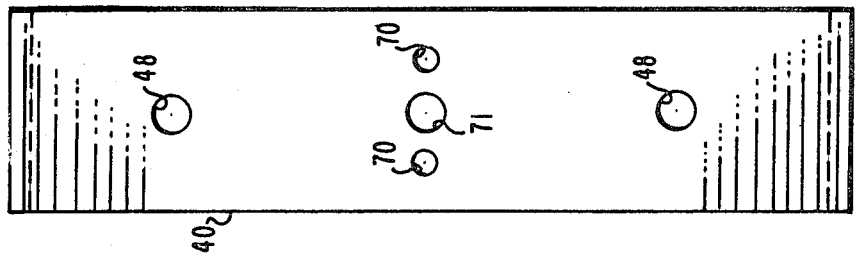
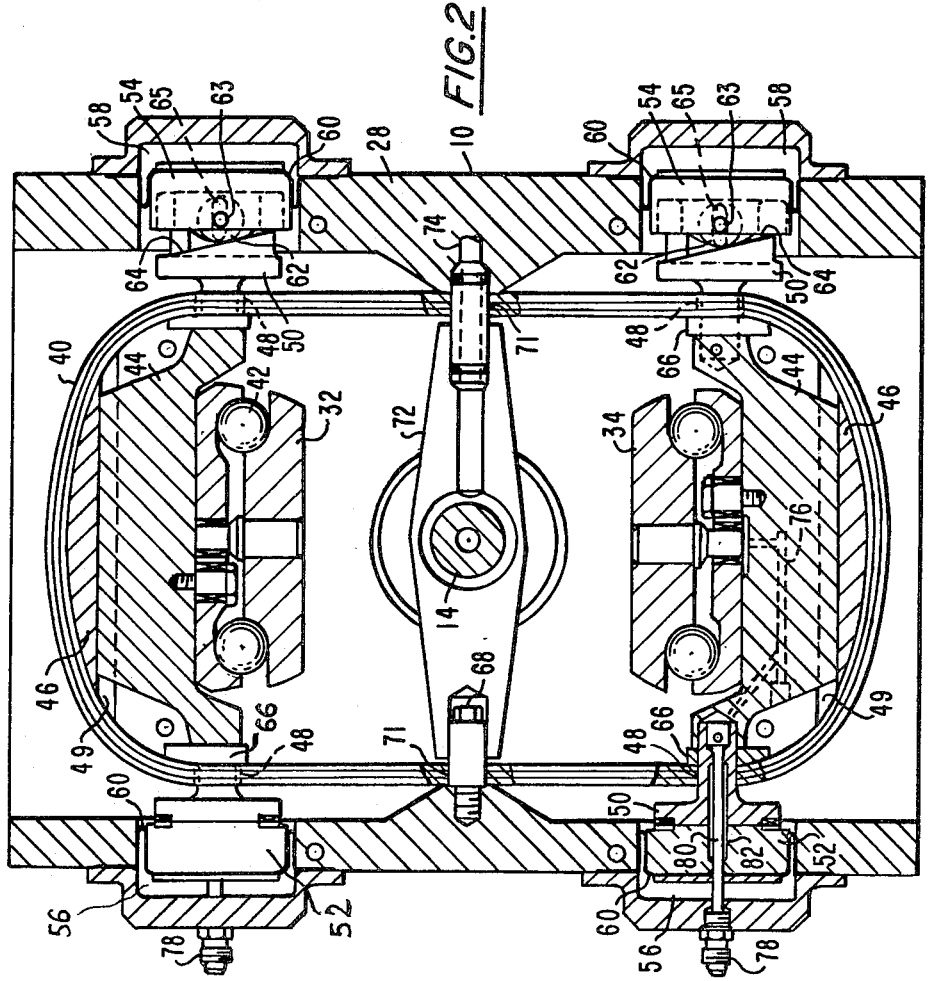

4,386,536

INFINITELY VARIABLE TRACTION ROLLER TRANSMISSION

BACKGROUND OF THE INVENTION

The invention relates to an infinitely variable traction roller transmission in which power is transmitted through traction rollers pivotally supported between toric input and output discs by a flexible support structure extending in the space between the discs and interconnecting the supports for the traction rollers.

In such transmissions, the traction rollers are mounted on support structures which, when pivoted, cause engagement of the traction rollers with the toric discs in circles of varying diameters depending on the desired transmission ratio. The pivotal traction roller support structures are so mounted that they can be moved axially for initiating a change in the transmission ratio. This is accomplished for example by flexible support sheets as shown in U.S. Pat. No. 4,086,820 which issued May 2, 1978 to Charles E. Kraus.

However, the forces applied to the traction rollers and through the traction roller support structure to the tension sheets are substantial and, consequently require support structure of great strength together with an adequate pivot bearing therefor. Also, the connections of the tension sheets to the traction roller support structure require special care in order to avoid problems after extended use of the transmission.

SUMMARY OF THE INVENTION

In order to firmly support the traction roller support structures with a relatively light support structure which is not exposed to bending loads and to avoid stress concentrations on the support structure, force balancing structures are provided in the form of bands extending continuously around the traction roller support structures and the traction roller support structures are nested in curved portions of the bands. The support structures consist of saddles engaging the bands and trunnions seated on the saddles such that the trunnions are pivotal about an axis which, under load, is a tangent to the center circle line of the toroidal cavity formed between the toric discs. With this arrangement the transmissions are not exposed to any bending forces as the load applied to the traction rollers is directly transmitted from the trunnions through the saddle to the balancing bands.

BRIEF DESCRIPTION OF THE DRAWINGS

FIG. 2 is a cross-sectional view of the transmission along lines II—II of FIG. 1; and FIG. 3 is a plan view of the force balancing flexure bands extending around and supporting the traction roller support structures.

DESCRIPTION OF THE PREFERRED EMBODIMENTS

Figure 1:
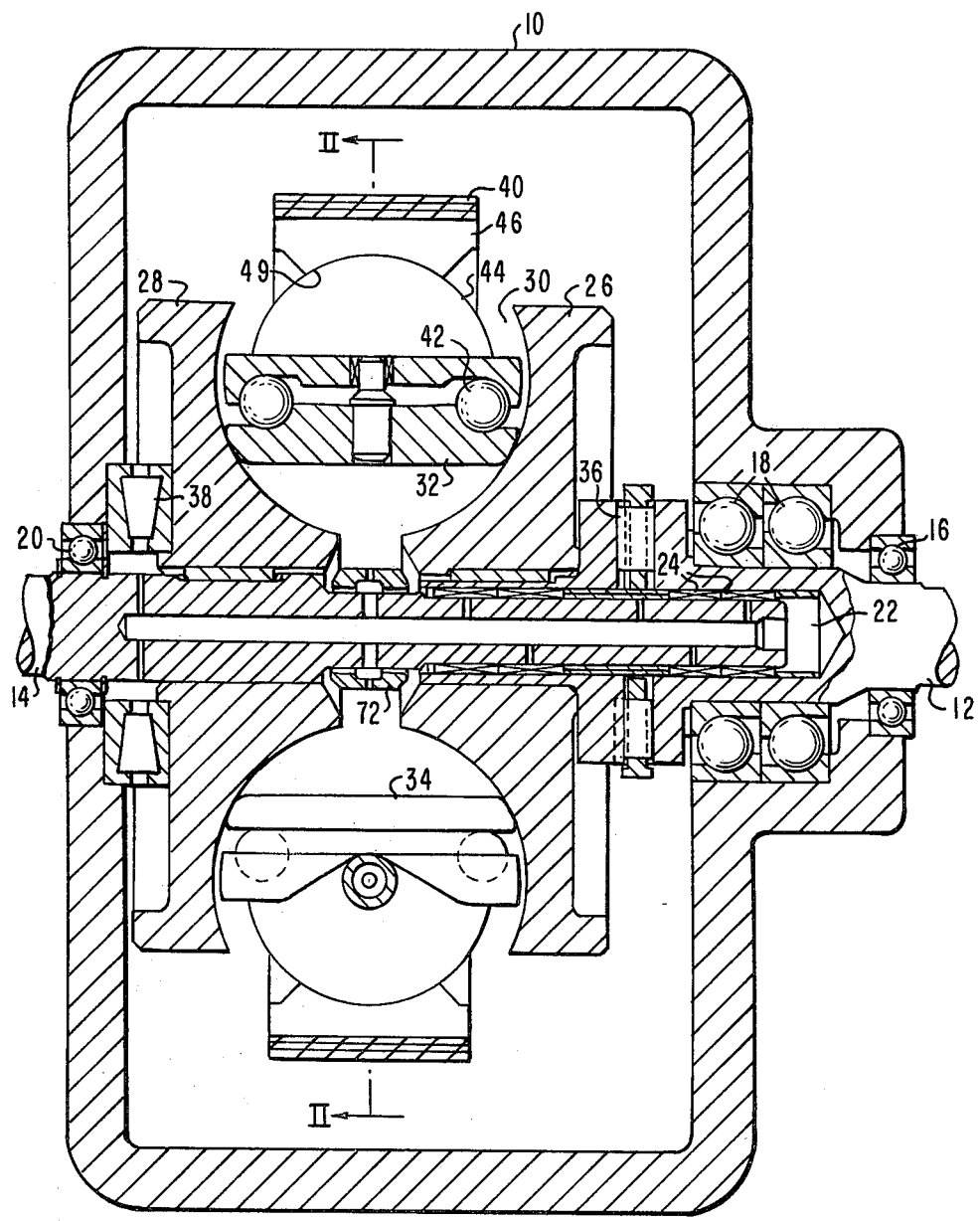
FIG. 1 is an axial cross-sectional view of the transmission.

A traction roller transmission as shown in FIG. 1 consists of a housing 10 having coaxial input and output shafts 12 and 14 rotatably supported therein by bearings 16, 18 and 20. The output shaft 14 extends into a bore 22 in the input shaft 12 and is rotatably supported therein by bearings 24. Associated with the input and output shafts 12 and 14 are toric traction discs 26, 28 so arranged opposite each other that a toric cavity 30 is formed therebetween. Within the toric cavity 30, traction rollers 32, 34 are rotatably supported and are in engagement with the traction discs 26 and 28 for transmission of motion between the discs. Engagement of the traction rollers 32, 34 with the traction discs 26 and 28 is obtained by an axial cam structure 36 which forces the input traction disc 26 toward the output traction disc 28 and into firm engagement with the traction rollers 32, 34 therebetween with a force which depends on the torque transmitted through the transmission. The axial thrust forces are taken up by the angle bearings 18 at one side and by an axial thrust bearing 38 at the other side of the traction discs.

Operation of the transmission, in principle and of the features described so far is the same as described for the transmission disclosed in U.S. Pat. No. 4,086,820 and reference is made herewith to said patent for detailed description of the various features and their operation.

The support arrangement for the traction rollers 32 and 34 to which the present invention is directed is shown in greater detail in FIG. 2 where a flexible force balancing band assembly 40 is seen extending around the traction rollers and their supports.

The rollers 32 and 34 are rotatably supported through axial thrust bearings 42 by a pivotal trunnion 44. The trunnion is supported by a saddle member 46 nested in a curved section of the band assembly 40 and connected thereto. The saddle member 46 has a bearing surface 49 abutting the trunnion 44 and both are so curved that the centerline of curvature is a tangent of the center circle of the toroidal cavity 30 such that each traction roller together with the associated trunnion is pivotal about such tangent. A low friction pivot joint may be formed for example by a low friction material on aluminum or carburized steel on carburized steel. In any case, the forces applied to the traction rollers 32 and 34 are directly transmitted to the force balancing band assembly 40.

The band assembly 40 consists of a flexible band wound spirally on a mandrel or of individual full loop concentric bands. Preferably, the band assembly 40 has openings 48 in axial alignment with the trunnions 44 through which trunnion extensions 50 project to permit application of precess forces directly to the trunnions 44. The trunnion extensions 50 are engaged by control pistons 52 at one end and control pistons 54 at the opposite end which pistons are disposed in cylinders 56, and 58 formed in the transmission housing in axial alignment with the trunnions. To allow for some radial motion the pistons 52 and 54 are disposed in the cylinders 56 and 58 with radial clearance and rolling diaphragms 60 (Belloframs) are provided between the control pistons 52, 54 and the associated cylinder walls 56, 58. At least one of the sets of pistons, 54, has rollers 62 mounted thereon and the associated trunnion extensions 50 have cam surfaces 64 engaged by the rollers 62 to apply a torque to the trunnions 44 together with axial precess forces as, in principle, it is described for the transmission disclosed in U.S. Pat. No. 4,086,820. Dowel pins 63 mounted on the pistons 54 extend into guide slots 65 in the housing 10 and prevent the pistons 54 from rotating when generating said torque. Axial trunnion support braces 66 are arranged around the trunnions 44 at the flexure band assembly and anti-friction axial thrust bearings may be provided between the braces and the trunnion, the braces being curved where they contact the flexure band assembly to fit the curved section of the flexure band assembly to which they are connected.

The flexure band assembly is shown with an eliptical curvature in the areas in which the saddles 46 are seated but any other curved shapes could be used such as circular or parabolic shapes, which minimize the strain on the flexure band assembly and hold radial sag of the saddle, trunnion and traction roller structure under load to a minimum.

The flexure band assembly 40 is held in position in the housing 10 in an area centrally between the trunnions 44 by bolts 68 extending through openings 70 (FIG. 3). Bolts 68 extending through openings 71 secure a bridge member 72 for supplying lubricant to the input and output shafts 12 and 14 through a lubricant supply conduit 74. The traction roller support bearings receive lubricant through passages 76 extending through the trunnion 44 which supply passages are in communication with lubricant supply fittings 78 by means of a standpipe 80 extending through a passage 82 in the piston 52.

The invention is not limited to the arrangement as described. Naturally, direction of power transmission may be reversed, that is, input shaft may be output shaft and vice versa. Also, the invention is not limited to transmissions with the type of traction rollers shown in the drawings.

Disc rollers, for example of the type as used in connection with arrangements as described in U.S. Pat. Nos. 3,413,864 and 3,802,284 may be employed. Further, instead of a hydraulic speed changing control, a mechanical speed changing mechanism may be used.

With a traction roller transmission as described heretofore the traction roller forces are balanced against each other directly through the balancing bands which extend around and behind the roller support structures and on which the roller support structures are seated such that no stress peaks occur in the bands and the traction roller support structures may be of light design as they are not subjected to bending forces.

As shown in the drawings there are two traction rollers in a transmission but there may well be more rollers, for example three arranged in radial symmetry, the forces on all being balanced by a balancing band assembly extending therearound.

What is claimed is:

1. An infinitely variable traction roller transmission comprising: coaxial input and output shafts; toric discs supported opposite each other, one by said input and the other by said output shaft for rotation therewith, said toric discs defining therebetween an annular space of circular cross-section having a center circle; at least two motion transmitting traction rollers disposed in the annular space between said toric discs in radial symmetry with respect to the axis of said input and output shafts; means for forcing said toric discs and said traction rollers in engagement with each other for the transmission of motion therebetween; a pivotal support structure for said traction rollers; and force balancing tension means extending between said roller support structures for balancing radial forces therebetween; said force balancing tension means consisting of a flexible band loop assembly extending completely around the traction roller support structures and having curved sections adjacent said traction roller support structures, said band loop assembly having saddles nested in said curved sections thereof and having curved seating surfaces for the traction roller support structures, each with a center of curvature along an axis which is essentially a tangent to said center circle of the annular space between said toric discs to permit pivoting of said traction roller support structure about such center circle tangent for a change of the transmission ratio of said transmission.

2. A traction roller transmission as claimed in claim 1, wherein said traction roller support structures are trunnions and said band assembly has openings in axial alignment with said trunnions, said trunnions extending through said openings and having precess pistons at their ends which are received in cylinders for axially moving said trunnions to cause the traction rollers to move into different circles of engagement with said toric discs for a change of the transmission ratio.

3. A traction roller transmission as claimed in claim 2, wherein said cylinders are formed in a housing surrounding the transmission and rolling diaphragms are arranged between, and connected to, the pistons and cylinders.

4. A traction roller transmission as claimed in claim 2 or 3, wherein said balancing band assembly consists of a number of bands concentrically fitted in each other.

* * * * *